J. L. JOHNSON.
MOLDING APPARATUS.
APPLICATION FILED JUNE 20, 1919.
1,328,433.
Patented Jan. 20, 1920.
2 SHEETS—SHEET 1.
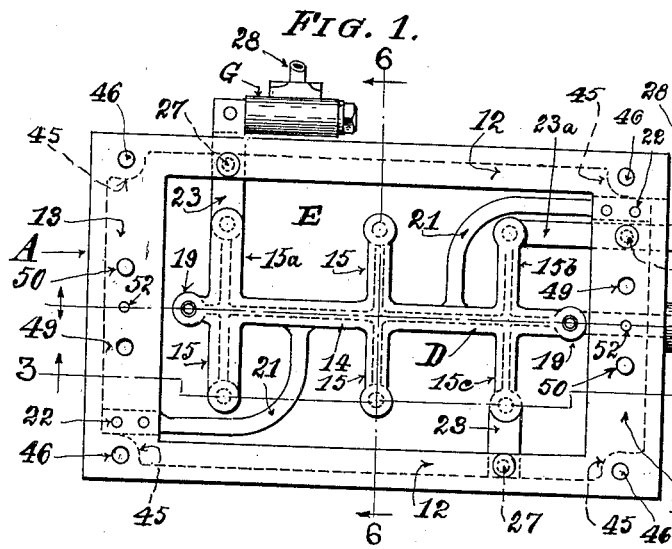
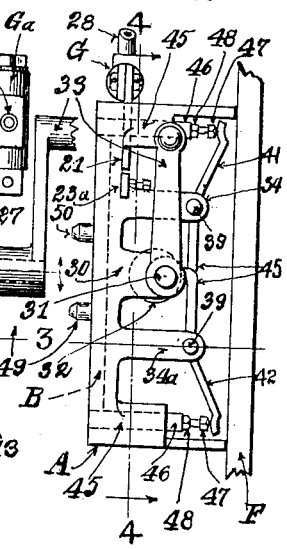
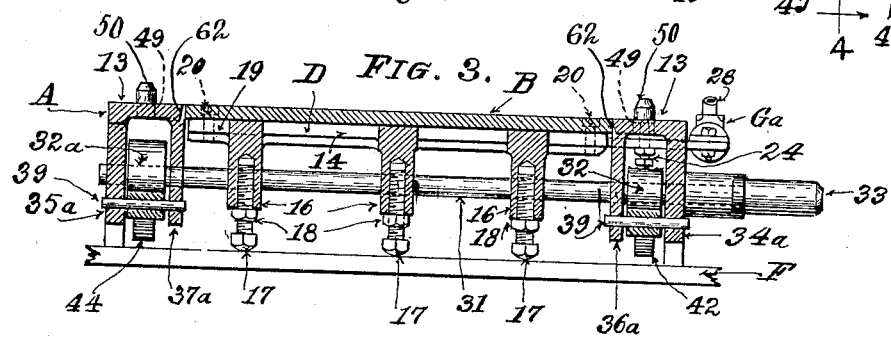
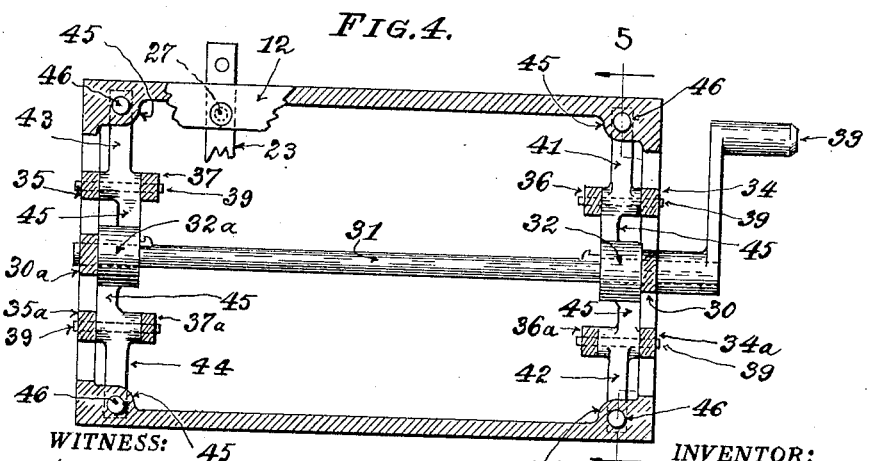
WITNESS:
Ch. Stark.
INVENTOR:
J. LOUIS JOHNSON,
BY Michael J. Stark & Son,
ATTORNEYS.

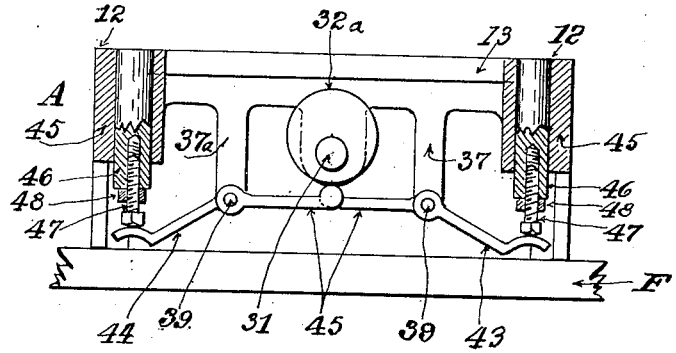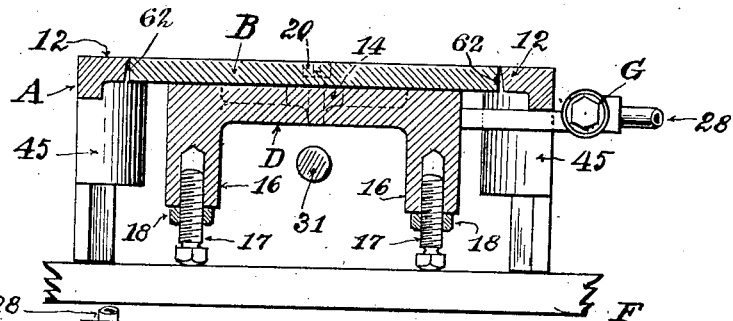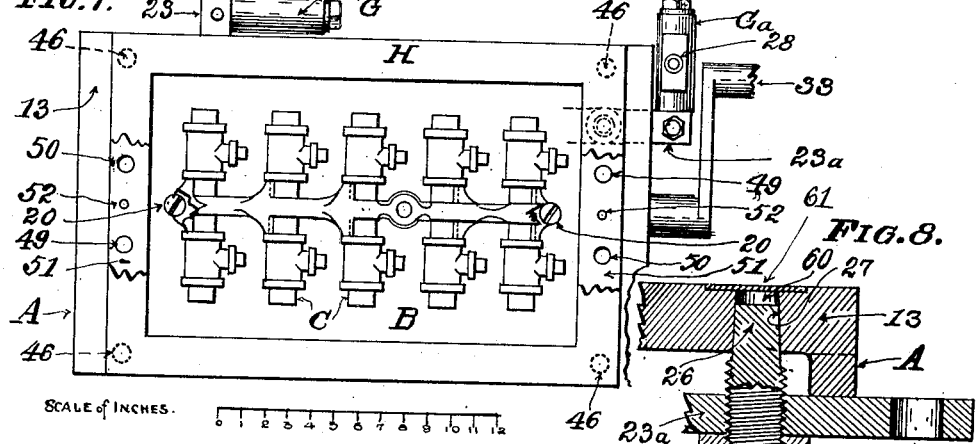

UNITED STATES PATENT OFFICE.

JOHN LOUIS JOHNSON, OF CHICAGO, ILLINOIS.

MOLDING APPARATUS.

1,328,433.  Specification of Letters Patent.  Patented Jan. 20, 1920.

Application filed June 20, 1919. Serial No. 305,457.

*To all whom it may concern:*

Be it known that I, JOHN LOUIS JOHNSON, a citizen of the United States, and resident of the city of Chicago, in the county of Cook and State of Illinois, have invented certain new and useful Improvements in Molding Apparatus; and I do hereby declare that the following description of my invention, taken in connection with the accompanying sheets of drawings, form a full, clear, and exact specification which will enable others skilled in the art to which the said invention appertains to make and use the same.

This invention has general reference to molding apparatus, and it consists, essentially, in the novel and peculiar combination of parts, and details of construction, as hereinafter first fully set forth and described, and then pointed out in the claims.

The object of this invention is the production of an efficient, and serviceable molding apparatus, which is adapted for use in molding machines generally, and also for bench molding by means of pattern plates on which the patterns are mounted. In the type of molding machines in which stripper plates are not employed, it is essential that the pattern plate with its patterns be rapidly vibrated or rapped to cause the molding sand to leave the patterns when the patterns are drawn from the mold; and it is to this type of molding machines to which my invention appertains.

Another object of this invention is the installation in such an apparatus of means whereby the pattern plate with its patterns may be slightly moved in both, longitudinal and transverse, directions; and other means whereby these movements can be accurately regulated.

Still another object of this invention is the introduction of means whereby the molding flasks can be lifted from the pattern plate in an absolutely straight, vertical direction, the latter means being manually operative, all as will hereinafter fully appear.

In the drawings which illustrate the preferred embodiment of my invention, and form a part of this specification,—

Figure 1 is a plan view of this molding apparatus, the pattern plate with its gated patterns mounted thereon, and shown in Fig. 7, being omitted. Fig. 2 is an end elevation of the same, the means for supporting the pattern plate, being omitted. Fig. 3 is a longitudinal vertical section on the indirect line 3—3 of Fig. 1. Fig. 4 is a sectional plan of the apparatus below the line 4—4 of Fig. 2. Fig. 5 is a transverse sectional view on the indirect line 5—5 of Fig. 4, the mechanism for vertical adjustment of the pattern plate shown in Figs. 3 and 6, being omitted in this figure as well as in Fig. 4. Fig. 6 is a transverse sectional view on line 6—6 of Fig. 1. Fig. 7 is a plan view of the apparatus with the pattern plate and a molding flask in position ready for being filled with sand. Fig. 8 is a sectional view of a portion of the device and illustrating the means for limiting the horizontal movement of the pattern plate.

Like parts are designated by the same characters and symbols of reference in all the figures.

A, in the drawings indicates a, preferably cast iron, skeleton frame of rectangular contour, comprising four vertical members the upper margins of which are inwardly extended to afford longitudinal flanges 12, and transverse flanges 13, the latter flanges being wider than the former flanges, for the purpose hereinafter to be referred to. The open space or "sight" E, between the flanges serves to receive a pattern plate B, carrying a multiplicity of gated patterns C, said pattern plate being slightly less in length and width than the space E, and of approximately that of the thickness of the flanges 12, 13. This pattern plate is adjustably supported in horizontal position by a skeleton frame D, comprising a longitudinal bar 14 extending nearly the entire length of the opening E, and preferably T-shaped transversely, as indicated in Fig. 6, and a series of branches or transverse bars 15, 15ª, which latter bars terminate in downwardly extending bosses 16, the bores of which are tapped to receive adjusting screws 17, on which are mounted locking nuts 18, to maintain the adjusting screws in adjusted position.

The skeleton frame or housing A, is mounted upon a platen F, usual in molding machines; but when this device is to be used on a bench for bench molding, it is provided with a metallic base plate upon which the heads of the adjusting screws 17 bear. The terminals 19, of the bar 14 are tapped to receive, preferably, fillister-head machine screws 20, the heads of which are countersunk in the pattern plate and flush with the upper surface thereof; and by means of these screws 20 the pattern plate is removably secured to the supporting frame D.

From near the ends of the bar 14 there extend two pronouncedly curved bars 21, which bars extend to, and pass underneath, the flanges 13, and to which they are secured by screws 22. These curved bars 21 are rather slender so as to be somewhat resilient so that the supporting frame D may move in any direction horizontally, and return to its normal position by the elastic properties of these curved bars.

The bars 15$^a$, and 15$^c$ of the supporting frame have extensions 23, projecting therefrom in opposite directions to, and underneath, the flanges 12, and projecting from the transverse bar 15$^b$ there is a similar bar 23$^a$. Each of these extensions is tapped to receive an adjusting bolt 24, having a locking nut 25, to maintain the adjusting bolt 24 in adjusted position. The upper end of this bolt is tapered, as at 26, and in the proper position in the flanges 12, 13, there are three tapering holes 27, which the tapering portion of the bolt 24 enters. These three bolts 24 serve the object of affording means for limiting the movement of the supporting frame and the pattern plate, in the following manner:

Let it be assumed that the taper 26 of the bolt 24 is 1/32 to the inch, and that the bolt has 16 threads to the inch. When the supporting frame D is in normal position so that the pattern plate is perfectly free to move in any horizontal direction, the locking nuts 25 on the bolts 24 are slackened and the bolts 24, which turn quite freely, rotated until the taper ends thereof snugly engage the tapering bores 27. When thus adjusted there could be no horizontal movement of the supporting frame; but rotating now these screws in the proper direction, the tapering portions 26 will have a slight play or slackness, which with the dimensions and data given would be 1/1000 of an inch (.001) in any direction horizontally from the normal position. Thus the supporting frame may vibrate and this motion is produced by two vibrators, G, G$^a$, of usual construction, one of which being bolted to the outer terminal of the bar 23, and the other to the outer end of the extension 23$^a$.

Pattern plates vary in thickness, some being thicker than others; and since it is desirable that the upper surface of the pattern plate be always flush with the upper surface of the housing A, means for vertically adjusting the pattern plates are necessary. These means include the adjusting screws 17 in the bosses 16, of the supporting frame D, by which the latter can be readily moved vertically in either upward or downward direction as may be required. And it may here be noted that these adjusting means in nowise prevent horizontal movement of the supporting frame; and this also includes the curved bars 21, which, though fixed at one end to the housing, permit vertical movement of these curved bars at their junction with the longitudinal bar 14, owing to the slenderness of these bars, while at the same time these curved bars are sufficiently rigid to maintain the supporting frame in normal position as long as it, or the pattern plate, are not disturbed by external forces.

When a pattern plate with its gated patterns has been located in proper position, and a molding flask H placed upon the housing A, and then filled with molding sand and compressed either by squeezing or ramming, the vibrators G, G$^a$, are put in operation by a fluid under pressure transmitted thereto by suitable connection 28, to rapidly shake the supporting frame D with the pattern plate and gate of patterns, and while this rapping is going on, the flask H is lifted from the casing A, by mechanism, as follows:

From the sides of the casing A, and medially thereof, depend two bars 30, 30$^a$, the lower extremities of which are bored to serve as bearings for a shaft 31, upon which there are mounted two eccentrics 32, 32$^a$, directly underneath the flanges 13, there being at one end of said shaft a crank 33, by which the shaft can be oscillated. From the ends of the casing A, and spaced apart from the depending bars 30, 30$^a$, there are at each end of the casing two other depending bars 34, 34$^a$, 35, 35$^a$, and in parallel spaced relationship thereto other depending bars 36, 36$^a$, 37, and 37$^a$, all of which are bored at their lower ends to serve as bearings for pivotal pins 39 upon each one of which there is rotatably mounted a lever, 41, 42, 43, 44, one arm, 45 of each pair of coacting levers extending underneath the corresponding eccentric, as best seen in Figs. 2 and 5.

In the four corners of the casing A there are formed bosses 45, which are vertically bored to receive pins 46, which pins pass through, and project from the lower ends of said bosses a proper distance. The lower end of each of these pins or rods 46 are bored and tapped to receive adjusting screws 47, best seen in Figs. 5 and 6, said adjusting screws having locking nuts 48, by which said screws 47 are held in adjusted position.

The heads of these screws rest upon the curved ends of the second arm of the levers so that when all the parts appertaining to the lifting mechanism are in the normal position shown in the drawings, the upper ends of the rods 46 are flush, with, or slightly below the upper surface of the casing A. When a molding flask H is to be lifted from the apparatus, the crank 33 is turned about one half of a revolution, the eccentrics acting upon one arm of the levers 41, 42, 43, and 44, will depress the same, the other arms of these levers will accordingly rise and push the rods 46 upwardly, and with them the flask H. The vibrators G, G$^a$, must, of course be started before the crank 33 is turned to insure rapping of the pattern plate before the flask is lifted.

It is quite essential that both the cope and the drag of a molding flask be correctly placed upon the apparatus to insure exact matching of the molds and the castings produced therein. To secure this result, there are in each of the two flanges 13 a hole 49, and spaced therefrom, a pin 50, which hole and pin are spaced equi-distant from a longitudinal center line shown in Fig. 1, and indicated by double-pointed arrows; and in a like manner all of the patterns on the pattern plate are located from this center line. The patterns on one side of this center line form one half of a set of complete castings, and the patterns on the other side of this center line form the other half of the casting. The faces of the flasks H are provided with metallic plates 51, which plates have pins and holes corresponding to the holes and pins in the flanges 13, that is to say, the pins on these plates enter the holes in the flanges, and the pins on the flanges enter the holes in the plates. It will now follow that when a cope and a drag are placed one upon the other, the pins on one flask will enter the holes in the opposing flask, and thereby attain positive register of the castings. To secure this accuracy, a steel, hardened jig or templet is made which has a pair of removable gage-pins in the center line of the jig, and four holes spaced very accurately from this center line. This jig is then correctly placed upon the upper surface of the casing A, and two small holes 52, drilled in the flanges 13. Now the gage-pins are inserted in the jig and then four holes drilled and reamed in the flanges, and then the pins 49 inserted in the proper holes.

A like process is performed on all of the flasks which are to be used on this apparatus so that absolute interchangeability is assured. The flasks usually employed in this method of machine molding are what are known as snap-flasks, which are removed from the molds when the latter are placed on the molding floor for pouring. These flasks have sockets and pins for guiding the cope onto the drag. These pins fit rather loosely in their sockets and if relied upon to locate the flask parts together, would result in many faulty castings. These flask pins and sockets serve, however, as initial guides until the pins 49 on the flask members enter the holes 50 in the same, and thus insure proper locating of the copes upon the drags.

This present apparatus is adapted for use on nearly all molding machines of the squeezer type now employed, by being placed upon the platen thereof, and also in machines where the ramming is manually and otherwise performed; but it is especially well adapted for bench molding. The pattern plate shown in Fig. 7, carries 10 patterns of a reducing T 1 x 1 x 1/2, as may be ascertained by the reduced scale of inches shown in connection with this figure; but it is to be remembered that this is but one of almost endless instances of patterns which can be used on this apparatus.

In view of the fact that the pattern plate is vibrated and the tapering portion of the adjusting screws 24 touches the wall of the tapering bore 27 a countless number of times in a working day, it is reasonable to expect wear of these tapering portions. This wear will have the effect of increasing the distance which the pattern plate will move, which, however, is not permissible since it will cause an appreciable increase in the size of the castings, and might result in offset castings. This objection is, however, readily overcome by making the tapering portion 26 of the screw 24 shorter than the depth of the bore 27, thereby leaving a vacant space 60, above the screw so that by a screwing-up of this screw this wear is immediately compensated for. And in order to prevent molding sand from entering the bores 27, they are either not drilled entirely through the flanges, or plates 61, Fig. 8, are countersunk in the upper surface of the casing over said bores 27, to be flush with the upper surface of the casing A.

Mention may also be made of the fact that the inner edges of the flanges 12, 13, are beveled, as shown at 62 in Figs. 3 and 6, so that molding sand which finds its way into the interstices between the edges of the pattern plate and the inner edges of the flanges will drop out of these interstices, which, if clogged with sand, would prevent the pattern plate from moving when the vibrators G, G$^a$ are put in action.

While I have hereinbefore described the preferred embodiment of my invention, I desire it to be understood that I am aware that changes in the details of construction shown may be made, and parts omitted if desired without departing from the scope of my invention as defined in the appended claims.

Having thus fully described this invention, I claim as new, and desire to secure to myself by Letters Patent of the United States—

1. In an apparatus of the nature described, the combination, of a portable housing, a pattern plate in said housing, means for supporting said pattern plate in said housing, means for imparting horizontal movement to said pattern plate, and means for adjustably limiting the horizontal movement of said pattern plate.

2. In an apparatus of the nature described, the combination, of a portable housing, a pattern plate in said housing, means for supporting said pattern plate in said housing, means for imparting horizontal movement to said pattern plate, and means for limiting the horizontal movement of said pattern plate, the means for supporting said pattern plate being vertically adjustable.

3. In an apparatus of the nature described, the combination, of a portable housing, a pattern plate in said housing, means for supporting said pattern plate in said housing, means for imparting horizontal movement to said pattern plate, means for limiting the horizontal movement of said pattern plate, the means for supporting said pattern plate being vertically adjustable, and means in said housing for vertically lifting a molding flask from said housing to withdraw patterns mounted on said pattern plate from said molding flask.

4. In an apparatus of the nature described, the combination, of a portable housing, a pattern plate in said housing, means for supporting said pattern plate in said housing, means for imparting horizontal movement to said pattern plate, means for limiting the horizontal movement of said pattern plate, the means for supporting said pattern plate being vertically adjustable, and means in said housing for vertically lifting a molding flask from said housing to withdraw patterns mounted on said pattern plate from said molding flask, the latter means being manually operated.

5. In apparatus of the nature described, the combination, of a portable housing, a pattern plate in said housing, means for supporting said pattern plate in said housing flush with the upper surface of said housing, means for imparting horizontal movement to said pattern plate, and means for limiting the horizontal movement of said pattern plate, said supporting means including a frame structure, said frame structure having downwardly extending bosses and adjusting screws in said bosses, said pattern plate being removably secured to said supporting frame structure.

6. In an apparatus of the nature described, the combination, of a portable housing, a pattern plate in said housing, means for supporting said pattern plate in said housing flush with the upper surface of said housing, means for imparting horizontal movement to said pattern plate, and means for limiting the horizontal movement of said pattern plate, said supporting means including a frame structure comprising a longitudinal bar directly underneath said pattern plate, said bar having laterally extending members; said laterally extending members terminating in downwardly extending bosses, adjusting screws in said bosses, the terminals of the said longitudinal bar being tapped, said pattern plate being removably secured to said terminals of the longitudinal bar.

7. In an apparatus of the nature described, the combination, of a housing, a pattern plate movably supported in said housing, and means for horizontally moving said pattern plate, said means including a frame structure comprising a longitudinal bar to which said pattern plate is removably secured, said longitudinal bar having a series of laterally extending members projecting beyond the outer margins of said housing, said longitudinal bar having a multiplicity of pronouncedly-curved bars, the curvature being approximately right-angular, the terminals of said curved bars being fixed to said housing, said curved bars being slender and resilient, and vibrators at at least two of the laterally extending members of said longitudinal bar.

8. In an apparatus of the nature described, the combination, of a housing, a pattern plate movably supported in said housing, and means for horizontally moving said pattern plate, said means including a frame structure comprising a longitudinally disposed bar to which said pattern plate is removably secured, said longitudinal bar having a series of laterally extending members projecting beyond the outer margins of said housing, said longitudinal bar having a multiplicity of pronouncedly-curved bars, the terminals of said curved bars being fixed to said housing, said laterally extending members being provided with means for limiting the horizontal movement of said pattern plate.

9. In an apparatus of the nature described, the combination, of a housing, a pattern plate in said housing, patterns on said pattern plate, and mechanism located entirely in said housing for vertically lifting a molding flask mounted on said housing from said pattern plate, said lifting mechanism being manually operative.

10. In an apparatus of the nature described, the combination, of a portable housing, a pattern plate in said housing, means for supporting said pattern plate in said housing flush with the upper surface thereof, means for imparting horizontal movement to said pattern plate, and means for limiting the horizontal movement of said pattern plate, the means for limiting the horizontal movement of said pattern plate including a screw having a tapering end, said screw being rotatably mounted in the means for horizontally moving said pattern plate, and a tapering bore in the housing which said tapering portion of said screw is constructed to engage, whereby said means for imparting horizontal movement to said pattern plate may be locked against movement, and when said screw is rotated to partly withdraw said tapering end from said tapering bore, horizontal movement of said pattern plate may take place, the extent of this movement being limited by the extent of rotation of said screw.

11. In an apparatus of the nature described, the combination, of a portable housing, a pattern plate movably mounted in said housing, patterns on said pattern plate, and means for vertically moving a molding flask placed upon said pattern plate to withdraw said patterns from said molding flask, said latter means including a series of vertically movable rods mounted in said housing, a shaft rotatably mounted in said housing, eccentrics secured to said shaft, a series of levers pivotally mounted in said housing, one arm of said levers engaging said eccentrics, the other arms of said levers engaging said rods, and means for manually rotating said shaft.

12. In an apparatus of the nature described, the combination, of a portable housing, a pattern plate in said housing, patterns on said pattern plate, and means for vertically moving a molding flask to withdraw said patterns from said molding flask, said means including a series of vertically movable rods mounted in said housing, said vertically movable rods having adjusting screws at their lower ends to regulate the length of said rods, a shaft rotatably mounted longitudinally in said housing, eccentrics fixed to said shaft, a series of levers mounted in said housing, one arm of said levers engaging said eccentrics, the other arms of said levers engaging said screws in said vertically movable rods.

In testimony that I claim the foregoing as my invention, I have hereunto set my hand.

JOHN LOUIS JOHNSON.